United States Patent Office 3,382,097
Patented May 7, 1968

3,382,097
PROCESS OF TREATING TEXTILES AND OTHER MATERIALS WITH FLUORINATED ORGANIC AMIDO ACID COMPOUNDS TO IMPART REPELLENCY
William A. Erby, Alburtis, Pa., Basil Farah, West Seneca, N.Y., and Richard A. Flinn and Robert A. Walde, Emmaus, Pa., assignors to Air Products and Chemicals, Inc., Philadelphia, Pa., a corporation of Delaware
No Drawing. Continuation-in-part of application Ser. No. 386,376, July 30, 1964. This application Oct. 6, 1965, Ser. No. 493,559
18 Claims. (Cl. 117—141)

ABSTRACT OF THE DISCLOSURE

Treatment of solid materials, particularly paper, and textiles of natural or artificial origin, to impart oil and soil repellency, by contact with a fluorinated organic acid compound of the formula $$C_nF_{2n+1}CONHCHRCOOH$$

wherein R is H or an alkyl radical of 1 to 8 carbon atoms and $n$ is an integer of 3 to 20. Representative treating compounds include: perfluoro-octanoyl glycine, perfluorobutanoyl amino acetic acid, perfluorobutanoyl - 2 - amino propionic acid, perfluoroundecanoyl - 2 - amino caprylic acid. The fluorinated organic acid compound is applied in aqueous or organic solution and may include colloidal silica or an air-curing organo poly siloxane.

---

This application is a continuation-in-part of Ser. No. 386,376, filed July 30, 1964 (now abandoned).

This invention relates to the treatment of solid materials to impart repellency toward soiling, staining and wetting by water, oil and dry soil by the use of certain fluorinated organic acid compounds.

The expression "solid material," as employed herein, includes cellulosic, proteinaceous, synthetic and other water-insoluble materials customarily employed in the manufacture of textile yarn and fabric, leather, paper, plastic sheeting, paint, wax, starch, wood, glass and ceramic clays as well as manufactured articles prepared therefrom such as articles of apparel, rugs, upholstered furniture, wallpaper, cardboard boxes, porous earthenware, floor tile, etc.

Many fluorinated compounds previously suggested by the art for imparting stain and wetting resistance to fabrics fail to impart effective repellency properties when applied from an aqueous medium and have been found deficient in their dry soil repellent characteristics. In fact, some of the commercial fluorinated compounds utilized for fabric treatment not only fail to repel dry soil but actually attract and hold such soil.

It is an object of the present invention to provide certain novel fluorinated organic acid compounds and to provide a method for their preparation. Another object is to provide means of imparting resistance to solid materials toward wetting by oil, staining by oil-borne stains and soiling by dry soil by applying particular fluorinated organic acid compounds or a mixture of said fluorinated organic acid compounds to the materials using conventional techniques such as padding, dipping, impregnation, spraying, etc.

The fluorinated organic acid compounds employed in this invention have the structure $$C_nF_{2n+1}CONHCHRCOOH$$

where $n$ is an integer of 3 to 20 and R is either hydrogen or an alkyl radical having 1 to 8 carbon atoms. Representative compounds include perfluorobutanoylaminoacetic acid; perfluorooctanoylaminoacetic acid; perfluoroundecanoylaminoacetic acid; perfluoropentadecanoylaminoactic acid, perfluorononadecanoylaminoacetic acid; perfluorobutanoyl - 2 - aminopropionic acid; perfluorooctanoyl - 2 - aminobutyric acid and perfluoroundecanoyl-2-aminocaprylic acid.

These compounds are synthesized from organic fluorine compounds presently being prepared by telomerization as well as electrolytic fluorination. The acid halide of perfluoroalkanoic acid may be obtained directly by one of the above procedures. In the other procedure, the product is subsequently converted to the acid chloride. Compounds of the formula $$C_nF_{2n+1}CONHCHRCOOH$$

are then prepared by reacting the aforementioned acid halide with a 2-amino carboxylic acid.

The resulting fluorinated organic acid compounds may be applied to solid materials, as herein defined, from aqueous or non-aqueous (organic solvent) media with or without the presence of additional surfactants, dispersants, propellants (e.g., nitrous oxide, propane, butane, carbon dioxide) etc., by padding, dipping, impregnation, spraying, etc. Spraying from an aerosol container or a spray gun is a particularly convenient method of application.

Concentrations of the active ingredients relative to solid materials such as cotton and similar diaphanous fabrics at above about 0.05 percent by weight have been found to give excellent and unique repellent properties. For the higher molecular weight fluorinated compounds, viz, $C_{7+}$, little change in repellency with increased amounts of the treating agent appears to occur up to concentrations approaching about 1 percent by weight of the fabrics. For rugs, leather, etc., the aforementioned repellent properties have been obtained when the active ingredients are added in the range of 0.05 to 5.0 grams/ft.$^2$ and preferably 0.1 to 10 grams/ft.$^2$.

Treatment of the solid materials by the indicated means and in the aforementioned concentrations not only imparts resistance to dry soiling and staining by oil-borne substances but imparts such resistance without being detected by either casual observation or feel.

While the following examples illustrate the nature of the present invention, the invention is not intended to be limited to these specific embodiments. Parts are by weight unless otherwise indicated.

EXAMPLE I

A suspension of 150 grams of glycine in a solution of 150 grams of perfluorooctanoylchloride and 300 mls. of ethyl acetate was heated at the reflux temperature until hydrochloric acid evolution was complete. The reaction mixture was filtered and the filter cake washed with three equal portions of ethyl acetate. The combined organic layers were concentrated at 80° C. under vacuum to a viscous oil which solidified on cooling. After washing with heptane to remove unreacted perfluorooctanoyl chloride and residual solvent, the solid was air-dried and recrystallized from a mixture of heptane and ethyl ether to give 152 grams of white solid product (perfluorooctanoyl glycine) corresponding to a 94 percent yield.

EXAMPLE II

Perfluorobutanoylaminoacetic acid was prepared by the following procedure. A suspension of 20 grams of aminoacetic acid in a solution of 20.7 grams of perfluorobutanoylchloride and 100 cc. of dry ethyl acetate was heated at the reflux temperature until hydrogen chloride evolution was complete. The reaction mixture was then filtered and the filter cake washed with ethyl acetate. The combined organic layers were concentrated at 80° C. under vacuum to a viscous oil which solidified on cooling. The solidified material was recrystallized from hot heptane to give 20 grams of yellow powder (perfluorobutanoylaminoacetic acid) corresponding to a 79 percent yield.

EXAMPLE III

The compound perfluorooctanoyl-2-aminovaleric acid was prepared by reacting under a slow stream of nitrogen 23.4 grams of 2-aminovaleric acid and 43.2 grams of perfluorooctanoylchloride in 250 cc. of ethyl acetate heated to its boiling point (~77° C.). After the evolution of HCl had ceased, the reaction mixture was filtered, washed with ethyl acetate and concentrated at 80° C. under vacuum to a viscous oil which solidified on cooling. Fifty-one grams of the desired compound were prepared.

EXAMPLE IV

A solution of 378.2 mg. of glycine in 5 ml. of distilled water is titrated to pH 10 with 3.02 ml. of 1.00 N sodium hydroxide. Upon addition of 1.50 ml. of ethylthioltrifluoroacetate the heterogeneous solution is placed on a mechanical shaker for 18 hours. The solution is acidified with 2 ml. of 1 N hydrochloric acid and extracted with 10 ml. portions of ethyl ether. The ethereal extract is then taken to dryness under reduced pressure. The crystalline residue, after drying to constant weight in a vacuum, constitutes the product, $C_4H_4F_3NO_3$.

Several standard commercial procedures have been developed in order to evaluate the effectiveness of compounds capable of imparting repellent properties to solid materials.

A. Water repellency (ASTM D583–58).—This test (known as the "water spray test") demonstrates how a treated fabric resists wetting under mild impact of water droplets.

Equipment.—A six-inch diameter funnel, ring stand, spray nozzle (19 holes, drill No. 65, 35/1000-inch diameter), metal embroidery hoop (six-inch diameter), sample holder block to hold sample at 45° to the horizontal and 250 cc. of distilled water.

Procedure.—A 7 x 7-inch sample of the treated fabric is placed in the embroidery hoop. The hoop is placed under the spray head at a 45° angle, so that the center of the hoop is 6-inches from the head and the center of the spray pattern will coincide with the center of the hoop. A 6-inch laboratory funnel is attached to the spray head to act as a reservoir. 250 milliliters of distilled water is then poured into the funnel. At the completion of the spray period, one edge of the hoop is held and tapped smartly once against a solid object. The wetted fabric is then compared with a standard chart or the description below.

Standard Spray Test Ratings (resistivity)

100—No sticking or wetting of upper surface
90—Slight random sticking or wetting of upper surface
80—Wetting of upper surface at spray points
70—Partial wetting of whole upper surface
50—Complete wetting of whole upper surface
0—Complete wetting of whole upper and lower surfaces B. Oil repellency.—The test for determining the oil repellency characteristics of a treatment material is based on the different penetrating properties of two hydrocarbon liquids, mineral oil and n-heptane. Mixtures of these two liquids are miscible in all proportions and show penetrating properties proportional to the n-heptane content of the mixture.

The oil repellency rating numbers below correspond with the A.A.T.C.C. Standard Spray Ratings which are now in use for testing repellent finishes.

| Composition of Liquid Mixtures for the Oil Repellency Test | | |
|---|---|---|
| Percent Mineral Oil | Percent n-Heptane | Oil Repellency Rating |
| 0 | 100 | 150 |
| 10 | 90 | 140 |
| 20 | 80 | 130 |
| 30 | 70 | 120 |
| 40 | 60 | 110 |
| 50 | 50 | 100 |
| 60 | 40 | 90 |
| 70 | 30 | 80 |
| 80 | 20 | 70 |
| 90 | 10 | 60 |
| 100 | 0 | 50 |
| (1) | | 0 |

[1] No holdout to mineral oil.

To measure oil repellency of a treated fabric, 8" x 8" swatches are placed flat on a table. The test mixtures are contained in small dropping bottles with ground-in pipettes. A drop of each mixture is gently placed (not dropped) onto the surface of the fabric, preferably in two different portions of the test samples. After three minutes, the degree of wetting and penetration of the fabric are observed.

From the above table, the number corresponding to the mixture containing the highest percent heptane which does not penetrate or wet the fabric after three minutes contact is considered the oil repellency rating of the specimen.

Usually, acceptable ratings are 90 and above, although beneficial effect to oil staining is sometimes obtained with ratings as low as 50.

C. Dry soil repellency.—The following test evaluates the dry soil stain resistance of treated fabrics. For a practical evaluation, comparisons are made between the treated and untreated fabric.

Formula for a standard synthetic dry soil

| Ingredient: | Percent by weight |
|---|---|
| Peat moss (dry) | 38 |
| Cement | 17 |
| Kaolin clay | 17 |
| Silica | 17 |
| Furnace black | 1.75 |
| Red iron oxide | 0.50 |
| Mineral oil | 8.75 |

The test consists of pouring a small quantity of the above mixture into a paper bag with 4" x 4" samples of the fabric. The bag is then shaken vigorously for one minute, the contents dumped out and the samples brushed smartly several times on each side with the finger tips.

Comparison of dry soiling can be made by either visual examination or photovolt reflectance of the treated and untreated samples. When the former method is employed, the samples are numerically evaluated on a 5-point scale— the lowest value for the best dry soil resistance: (1) Very good, (2) Good, (3) Satisfactory, (4) Bad, (5) Very bad.

The following procedure is followed for determination of dry-soil repellency by photovolt reflectance.

(1) The zero-point is set against the black surface of the instrument box and the 100-point is set against untreated cloth lying on a piece of standard, white blotting paper.

(2) A control is run using untreated cloth which has been exposed for one minute to the soiling mixture and then placed flat on white blotting paper.

(3) Other specimens are then evaluated by the same technique and the meter reading (present whiteness retained after soiling) is recorded.

Generally, acceptable meter readings are 75 or higher while superior meter readings are at least about 85.

EXAMPLE V

A 1% aqueous solution of perfluorooctanoyl glycine was prepared by adding perfluorooctanoyl glycine in small increments over a five minute period to distilled water. The water was maintained at 80° C. during the addition and stirred continuously. The mixture was subsequently allowed to cool to room temperature and was sprayed onto the materials in the following table. The materials were then tested in the above-indicated manner for oil and dry soil repellency properties.

| Material Treated | Repellency (Oil) | Repellency (Dry Soil) |
|---|---|---|
| Cotton | 140 | 1 |
| Wool | 140 | 2 |
| Nylon | 130 | 2 |
| Dacron | 130 | 2 |
| Glass Cloth | 140 | 1 |

For comparative purposes Zepel, an aqueous emulsion of fluoroorganic compounds, was applied to cotton fabric in a recommended concentration (3%). In this instance, the treated cloth gave an oil repellency rating in the neighborhood of 120 and a dry soil repellency index of 4. Similar results were obtained with Scotchgard FC–208, another aqueous emulsion of fluoroorganic compounds.

EXAMPLE VI

The unique oil and dry soil characteristics of the fluorinated organic acid compounds of this invention are illustrated in the following comparison with related perfluorinated carboxylic acids. In each instance the indicated compound was applied in an aqueous mixture to cotton fabric by spraying.

| Compound | Repellency (Oil) | Repellency (Dry Soil) |
|---|---|---|
| $CF_3CONHCH_2CO_2H$, 1% water | 0 | 5 |
| $C_3F_7CONHCH_2CO_2H$, 5% water | 80 | 3 |
| $C_7F_{15}CO_2H$, 2% water | 0 | 4 |
| $C_7F_{15}CONHCH_2CO_2H$, 1% water | 140 | 1 |
| $C_7F_{15}CONHCH(C_3H_7)CO_2H$, 1% water | 90 | 3 |
| $C_7F_{15}CHOHCH_2CO_2H$, 1% water | 0 | 4 |

In distinction to the detrimental effect of detergents on many of the aqueous treating solutions taught by the prior art, detergents do not materially alter the repellent properties of the fluorinated compounds of the present invention. Thus, by adding detergent to a mixture containing a fluorinated organic acid having the structure

$$C_nF_{2n+1}CONHCHRCOOH$$

it is possible in a one step operation to both clean a fabric and at the same time impart repellent properties thereto.

EXAMPLE VII

Cotton cloth was dipped in a mixture containing 1 weight percent Tide and a 1% aqueous mixture of perfluorooctanoyl glycine and then air dried. After ironing, the cotton cloth was found to have an oil repellency rating of 130 and a dry soil repellency of 2.

While water is a preferred solvent, especially when treating rugs, curtains and upholstered furniture, excellent repellency properties are obtained when the defined fluorinated organic acid compounds having the structure

$$C_nF_{2n+1}CONHCHRCOOH$$

are dissolved in organic solvents such as ethyl acetate, heptane, acetone, methyl ethyl ketone, 1-butanol, 3-methyl-2-butanol, 3-pentanol, etc., and applied to solid materials. In the following examples the treated materials were dried and then tested for the repellent properties imparted.

EXAMPLE VIII

A 2% ethyl acetate solution of perfluorooctanoylglycine perpared by dissolving perfluorooctanoyl glycine in ethyl acetate was applied to cotton fabric. The treated material exhibited an oil repellency rating of 130 and a dry soil repellency index of 1.5.

EXAMPLE IX

In this example, colloidal silica having a particle size of approximately 0.012 micron and/or isopropanol were mixed with water and perfluorooctanoyl glycine (RF–1). The resulting mixtures were applied to white cotton cloth by dipping the cloth in the mixtures and then padding the cloth to remove excess liquid. The quantities of materials used are reported as parts by weight. The reported reflectance values indicate the percent whiteness retained after soiling the cloth samples with the standard synthetic dry soil.

| Sample | RF-1 | Water | Silica | Isopropanol | Reflectance |
|---|---|---|---|---|---|
| 1 | | | | | 55 |
| 2 | 0.5 | 100 | | | 85 |
| 3 | 0.5 | 100 | | 5 | 89 |
| 4 | 0.5 | 100 | | 10 | 80 |
| 5 | 0.5 | 100 | 1.0 | 5 | 95 |
| 6 | 0.2 | 100 | | 5 | 78 |
| 7 | 0.2 | 100 | 0.1 | | 84 |
| 8 | 0.2 | 100 | 0.1 | 5 | 91 |
| 9 | 0.2 | 100 | 0.05 | 5 | 89 |
| 10 | 0.1 | 100 | 0.1 | 5 | 99 |
| 11 | 0.05 | 100 | 0.05 | 5 | 78 |

Sample 1 shows the amount of soiling that occurs on an untreated cloth. The remaining samples demonstrate the beneficial effect of adding colloidal silica and isopropanol separately to perfluorooctanoyl glycine as well as the synergistic result obtained from the combined action of the silica and isopropanol. While the treated cloth of sample 5 had an objectionable hand, essentially no change in hand or appearance was observed for samples 7 through 11 which employed lower amounts of silica.

For comparative purposes, samples 6 and 8 were duplicated with the exception that $C_7F_{15}CO_2H$ was substituted for RF–1. It was found that perfluoro-octanoic acid had no dry soil repellency.

EXAMPLE X

The effect of the type of metal oxide on dry-soil repellency was determined by mixing various metal oxides with formulations comprising isopropanol, water and perfluorooctanoyl glycine (RF–1). The resulting mixtures were applied to white cotton cloth by dipping the cloth in the mixture and then padding the cloth to remove excess liquid.

In the following table the finely divided metal oxides, viz., an aluminum oxide having a particle size range of 0.01–0.04 micron and a surface area of 50–100 $m.^2/g.$, a silicon oxide (Silica A) having a particle size of 0.012 micron and a surface area of 200 $m.^2/g.$ and a silicon oxide (Silica B) having a particle size of 7 millimicrons and a surface area of 350–400 $m.^2/g.$, were employed, as indicated, in the samples in an amount of 0.1 part by weight. The quantities of the other materials used are also reported as parts by weight. Reflectance values are shown as $Rt$ for treated samples and $Ru$ for untreated samples of identical cloth material.

| Sample | RF-1 | Water | Metal Oxide | Isopropanol | Rt/Ru |
|---|---|---|---|---|---|
| 1 | | 100 | Alumina | 5 | 50/41 |
| 2 | | 100 | Silica A | 5 | 52/45 |
| 3 | 0.1 | 100 | Alumina | 5 | 56/42 |
| 4 | 0.1 | 100 | Silica A | 5 | 90/42 |
| 5 | 0.1 | 100 | Silica B | 5 | 80/42 |

These results indicate that without RF–1 the formulations essentially have no dry soil repellency. The samples also show that very little improvement in dry soil repellency is obtained by the addition of aluminum oxide to the RF–1 formulation as compared with the addition of silicon oxide to the same formulation.

EXAMPLE XI

The importance of the physical characteristics of three types of colloidal silica employed in the repellency systems of this invention is demonstrated in the following tables.

| Type | Surface Area | Particle Size | Moisture Content |
|---|---|---|---|
| 1 | 200 m.²/gm. | 0.012 micron | 1.5% |
| 2 | 325 m.²/gm. | 0.007 micron | 4.0% |
| 3 | 325 m.²/gm. | 0.007 micron | 2.5% |

These types of colloidal silica were tested at the same concentration in identical repellency systems (both aqueous and organic solvent systems) with the following dry soil repellencies.

| Type | Aqueous System | Organic System |
|---|---|---|
| 1 | 93/45 | 90/45 |
| 2 | 91/45 | 88/45 |
| 3 | 83/45 | 81/45 |

EXAMPLE XII

Normally, it is not considered possible to dissolve perfluorinated compounds in non-polar solvents, while, as shown above, such compounds can be dissolved in polar solvents such as alcohols, esters and ethers.

It has been discovered, however, that perfluorinated compounds, as defined herein, may be dissolved in non-polar solvents by first dissolving them in a small quantity of a polar solvent such as isopropyl alcohol and then adding this solution to a non-polar organic solvent such as tetrachloroethane. For example, 1 gram of RF-1 was dissolved in 5 grams of isopropyl alcohol. This solution was then added to 100 grams of tetrachloroethane giving a completely homogeneous solution. For comparison, it was observed that RF-1 was completely insoluble when contacted with tetrachloroethane and did not dissolve when contacted with a mixture of tetrachloroethane and isopropyl alcohol in the same 20:1 ratio.

EXAMPLE XIII

Treatment systems for imparting water, oil and dry soil repellency to materials have been discovered which comprise blends of silicones and fluoro-organic compounds. This finding is surprising since the literature, quite uniformly reports that silicones and fluoro-organic compounds are incompatible, i.e., interfere with each other.

Organopolysiloxanes found to be particularly effective are those curing at room temperature which are prepared in accordance with U.S. Patent Nos. 3,170,894 and 3,175,995.

In the following table an air curing silicone characterized by an elemental analysis as having a relative ratio (to the lowest whole number) of one oxygen atom, one silicon atom, three carbon atoms and eight hydrogen atoms, was blended with perfluorooctanoyl glycine (RF-1) and ethyl acetate (EtAc) and employed to treat white cotton cloth. The water, oil and dry soil repellency characteristics of the treated cloth were compared with untreated cloth of identical material. All amounts in the table of this example are shown as parts by weight.

| Sample | Silicone | RF-1 | EtAc | Water | Oil | Dry Soil |
|---|---|---|---|---|---|---|
| 1 | | | | | | 42 |
| 2 | 1 | 1 | 100 | 90 | 130 | 62 |

In the following table the aforementioned silicone (S) was mixed in a Waring Blendor with RF-1, colloidal silica having a particle size of 0.012 micron, isopropanol (IP) and one of two solvents, trichloroethylene (TCE) or methylene chloride (MC). White cotton cloth was then treated by dipping and padding to a 50% by weight solution pick up. The results are shown for water, oil and dry soil repellency both before and after a commercial dry cleaning operation.

| Test | S | RF-1 | Silica | IP | TCE | MC | Water | Oil | Dry | After Dry Clean | | |
|---|---|---|---|---|---|---|---|---|---|---|---|---|
| | | | | | | | | | | Water | Oil | Dry |
| 1 | 1 | 1 | 0.2 | 30 | 120 | | 85 | 100 | 75/45 | 75 | 90 | 72/45 |
| 2 | 1 | 1 | 0.2 | 30 | | 120 | 85 | 100 | 82/45 | 70 | 90 | 80/45 |

Cotton cloth treated with the formulation of test 1 (in the above table) showed good repellency to such stains as ink and corn oil, excellent repellency to coffee stains and fair repellency to salad oil stains. Identical cotton cloth treated with the formulation of test 2 showed good repellency to ink and salad oil stains and excellent repellency to both corn oil and coffee stains. Organic systems similar to those discussed above were prepared and applied to white cotton cloth at approximately 70% by weight solution pick up with the following results (carbon tetrachloride is identified as CT in this table).

| Test | S | RF-1 | Silica | IP | TCE | MC | CT | Water | Oil | Dry |
|---|---|---|---|---|---|---|---|---|---|---|
| 3 | | 1 | | 30 | | 120 | | | 120 | 92/45 |
| 4 | | 1 | 0.2 | 30 | | 120 | | | 130 | 95/45 |
| 5 | 1 | 1 | | 30 | | 120 | | 70 | 100 | 82/45 |
| 6 | 1 | 1 | 0.2 | 30 | | 120 | | 75 | 110 | 89/45 |
| 7 | 1 | 1 | 0.2 | 30 | 120 | | | 85 | 100 | 83/45 |
| 8 | 1 | 1 | 0.2 | 30 | | | 120 | 85 | 110 | 75/45 |

EXAMPLE XIV

A treatment system composed of 1 gram of perfluorooctanoyl glycine, 1 gram of air drying silicone(S) 0.2 gram of a colloidal silica having a particle size of 0.012 micron, 30 grams of isopropanol, 60 grams of tetrachloroethylene, 60 grams of methylene chloride and 60 grams of dichlorodifluoromethane was packaged in an aerosol can and sprayed on several types of fabrics. The water, oil and dry soil repellency for each fabric is shown in the following table. The dual numbers in the last column respectively show the dry soil repellency of the treated and untreated fabric.

| Fabrics | Water | Oil | Dry Soil |
|---|---|---|---|
| Cotton | 85 | 100 | 85/45 |
| Dacron | 85 | 100 | 75/39 |
| Nylon | 70 | 110 | 75/58 |
| Wool | 85 | 110 | 53/25 |
| Acetate | 95 | 110 | 60/48 |

EXAMPLE XV

To determine the effect of treatment solutions at varying applied concentrations two mixtures were prepared and sprayed on cotton cloth from aerosol cans.

The first mixture consisted of 0.3 gram of perfluorooctanoylglycine, 5.0 grams of isopropanol, 50 grams of methylene chloride and 50 grams of ethane tetrachloride.

| Applied Concentration (grams/ft.²) | Repellencies | |
|---|---|---|
| | Oil | Dry Soil |
| 0.05 | 120 | 89/45 |
| 0.03 | 120 | 87/45 |
| 0.01 | 110 | 82/45 |
| 0.008 | 80 | 78/45 |
| 0.006 | 0 | 70/45 |

The second mixture consisted of 0.3 gram of perfluorooctanoylglycine, 0.3 gram of silicone(S), 0.05 gram of colloidal silica having a particle size of about 200 m.$^2$/gm., 5.0 grams of isopropanol, 50 grams of methylene chloride and 50 grams of ethanetetrachloride.

| Applied Concentration (grams/ ft.$^2$) | Repellencies | | |
|---|---|---|---|
| | Oil | Water | Dry Soil |
| 0.05 | 90 | 85 | 88/45 |
| 0.10 | 100 | 85+ | 88/45 |

Analysis of these data shows that fluorinated organic acid compound applied from an organic solvent gives an unexpectedly high oil repellency at as low a concentration as 0.01 g./ft.$^2$. When the silicone material employed was applied to cotton cloth by itself at a concentration of 0.05 g./ft.$^2$ only a very low water repellency of 50 was obtained.

EXAMPLE XVI

Unsized and rosin sized bleached kraft paper were treated with a solution of 0.1 gram of perfluorooctanoyl glycine, 0.2 gram of colloidal silica, 1 gram of air curing silicone(S), 30 grams of isopropanol, 60 grams of tetrachloroethylene and 60 grams of methylene chloride. Application was from an aerosol container.

| Repellency | Unsized | 1% Rosin |
|---|---|---|
| Oil | 130 | 130 |
| Dry Soil | 76/55 | 70/55 |
| Water | Repellent | Repellent |

EXAMPLE XVII

Perfluorooctanoylglycine (RF-1) dissolved in isopropyl alcohol at a concentration of 10% by weight was mixed with a flat, white oil base paint having the following composition:

| | Percent |
|---|---|
| Titanium dioxide | 9.8 |
| Titanium calcium | 13.0 |
| Calcium carbonate | 20.5 |
| Silicates | 11.7 |
| Soya-safflower alkyd resin | 12.5 |
| Distillate and drier | 32.5 |

The mixture was then applied with a brush in one coat to an unfinished wallpaper and allowed to dry overnight. Simultaneously, a coating of unmodified paint was also applied to identical wallpaper.

Oil, crayon, pencil and grease marks were then applied to the wallpaper and the number of hand scrubs (using Kim-Wipe wet with a water detergent solution) required to remove the stains was measured. The following data shows a significant reduction in the number of scrubs required to remove these marks as compared to the unmodified paint. The number of scrubs required to completely remove the film was found to be equal (45) for both the modified and unmodified paint.

| Sample | Stain RF-1 (wt. percent) | Oil | Stain Removal Scrubs | | | Repellency, Dry Soil |
|---|---|---|---|---|---|---|
| | | | Crayon | Pencil | Grease | |
| 1 | 0 | 0 | 41 | 23 | 16 | 89 |
| 2 | 0.1 | 100 | 11 | 6 | 4 | 100 |
| 3 | 0.05 | 100 | 22 | 6 | 4 | 100 |

EXAMPLE XVIII

A fluorinated organic acid compound having the formula $CF_3(CF_2)_xCONHCH_2COOH$ where $x$ is about 16 was applied from a $C_3H_7OH$ solution to 100% A.A.T.C.C. white cotton cloth in an amount equal to 1% of the fluorinated material per total weight of the fabric. The treated fabric was found to have a dry soil repellency rating of 92 compared to a rating of 45 for the untreated fabric.

Known anti-soiling substances such as aluminum silicate, water-proofing agents such as methylol-stearamide and methylene-bis-stearamide, anti-static agents, pigments, heat stability additives, etc., may be incorporated into the formulations of this invention if desired.

Obviously, many modifications and variations of the invention as hereinbefore set forth may be made without departing from the spirit and scope thereof, and therefore, only such limitations should be imposed as are indicated in the appended claims.

What is claimed is:

1. The process of treating paper and textile materials to impart repellency properties thereto which comprises contacting such a material with a solution containing as essential repellency imparting component a fluorinated organic acid compound having the structure

$$C_nF_{2n+1}CONHCHRCOOH$$

wherein $n$ is an integer of 3 to 20 and R is a member selected from the group consisting of hydrogen and alkyl radicals of 1 to 8 carbon atoms so as to deposit said compound on the material and allowing the material to dry; said solution containing 0.05 to 5% by weight of said acid compound.

2. The process of claim 1 wherein the material is cellulosic.

3. The process of claim 1 wherein the material is proteinaceous.

4. The process of claim 1 wherein the material is synthetic in origin.

5. The process of claim 1 wherein the solution is sprayed onto the material.

6. The process of claim 1 wherein the solution is padded onto the material.

7. The process of claim 1 wherein the material is dipped in the solution.

8. The process of treating paper and textile materials to impart repellency properties thereto which comprises contacting such a material with a solution containing as essential repellency-imparting component perfluorooctanoyl glycine so as to deposit said solution on the material and allowing the material to dry; said solution being employed in an amount and concentration to deposit at least 0.05% of the component by weight on the material.

9. The process of treating paper and textile materials to impart oil and soil repellency characteristics thereto which comprises contacting such a material with a repellency-imparting composition essentially consisting of an aqueous solution of perfluorooctanoyl glycine and allowing the treated material to dry; said solution containing about 0.05 to 5% by weight of said perfluorooctanyol glycine.

10. The process of treating paper and textile materials to impart oil and soil repellency characteristics thereto which comprises contacting such a material with a repellency-imparting composition essentially consisting of perfluorooctanoyl glycine dissolved in an organic solvent and allowing the treated material to dry; said solution containing about 0.3 to 2.0% by weight perfluorooctanoyl glycine.

11. The process of claim 10 wherein the organic solvent is ethyl acetate.

12. The process of claim 10 wherein the organic solvent is a mixture of ethyl acetate and heptane.

13. The process of claim 10 wherein the organic solvent is a chlorinated solvent.

14. The process of claim 10 wherein the solvent is isopropanol.

15. The process of imparting repellency properties to a material from the group consisting of cellulosic and proteinaceous materials, which comprises contacting said material with a mixture comprising a solution of from about 0.05% to 5.0% by weight fluorinated organic acid compound having the structure $$C_nF_{2n+1}CONHCHRCOOH$$

wherein $n$ is an integer of 3 to 20 and R is a member selected from the group consisting of hydrogen and alkyl radicals of 1 to 8 carbon atoms, said solution having dispersed therein about 0.05 to 1% by weight of a silicon compound from the group consisting of silica and air-curing organopoly siloxanes; and drying the treated material.

16. The process of claim 15 wherein the silicon compound is colloidal silica.

17. The process of imparting repellency properties to a material from the group consisting of cellulosic and proteinaceous materials, which comprises contacting said material with a mixture comprising a solution of from about 0.05 to 5% by weight fluorinated organic acid compound having the structure $C_nF_{2n+1}CONHCHRCOOH$ wherein $n$ is an integer of 3 to 20 and R is a member selected from the group consisting of hydrogen and alkyl radicals of 1 to 8 carbon atoms, said solution having dispersed therein at least about 0.3% by weight of an air-curing organopoly siloxane; and thereafter drying the treated material.

18. The process of treating a material from the group consisting of cellulosic and proteinaceous materials, to impart oil and dry soil repellency characteristics thereto which comprises dissolving at least one fluorinated organic acid compound, having the structure $$C_nF_{2n+1}CONHCHRCOOH$$

wherein $n$ is an integer of 3 to 20 and R is a member selected from the group consisting of hydrogen and alkyl radicals of 1 to 8 carbon atoms, in a polar organic solvent; adding the resulting solution to a non-polar organic solvent to obtain a treating solution containing 0.05 to 5.0% by weight of such fluorinated organic acid compound; and contacting said material with the obtained treating solution.

References Cited
UNITED STATES PATENTS

| | | | |
|---|---|---|---|
| 2,567,011 | 9/1951 | Diesslin et al. | 260—465.7 |
| 2,662,835 | 12/1953 | Reid | 117—121 |
| 3,088,958 | 5/1963 | Eleuterio | 117—121 X |
| 3,238,235 | 3/1966 | Hauptschein et al. | 260—208 X |
| 2,934,450 | 4/1960 | Brown | 106—287 |
| 3,351,643 | 11/1967 | Hauptschein et al. | 117—152 X |

WILLIAM D. MARTIN, *Primary Examiner.*

T. G. DAVIS, *Assistant Examiner.*